(12) United States Patent
Steigerwald et al.

(10) Patent No.: US 7,016,205 B2
(45) Date of Patent: Mar. 21, 2006

(54) RIPPLE-CURRENT REDUCTION SCHEMES FOR AC CONVERTERS

(75) Inventors: Robert Louis Steigerwald, Burnt Hills, NY (US); Richard S. Zhang, Rexford, NY (US); Michael Joseph Schutten, Rotterdam, NY (US); Andrew Michael De Rooij, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 173 days.

(21) Appl. No.: 10/676,898

(22) Filed: Oct. 1, 2003

(65) Prior Publication Data

US 2005/0073865 A1   Apr. 7, 2005

(51) Int. Cl.
*H02M 1/12* (2006.01)

(52) U.S. Cl. .............................. 363/40; 363/45; 363/47
(58) Field of Classification Search .................. 363/39, 363/40, 44, 45, 46, 47, 48
See application file for complete search history.

(56) References Cited

U.S. PATENT DOCUMENTS 5,038,263 A   8/1991   Marrero et al. ............... 363/20
5,663,876 A   9/1997   Newton et al. .............. 363/126
6,693,805 B1   2/2004   Steigerwald .................. 363/39

FOREIGN PATENT DOCUMENTS

DE   4437560   5/1996

OTHER PUBLICATIONS

Michael J. Schutten, et al, "Ripple Current Cancellation Circuit", Feb. 2003 IEEE, pp. 464-470.
G. Laimer, et al., "Zero-Ripple EMI Input Filter Concepts for Application in a 1-U 500kHz Si/SiC Three-Phase PWM Rectifier", IEICE/IEEE Intele C '03, Oct. 19-23, 2003, pp. 750-756.

*Primary Examiner*—Jeffrey Sterrett
(74) *Attorney, Agent, or Firm*—Fletcher Yoder

(57) ABSTRACT

An AC ripple current reduction circuit for an AC converter having: an AC voltage source at the input; a first capacitor across which the circuit output voltage is provided; a first, main inductor in series with the first capacitor and the input; an auxiliary circuit including a second capacitor and a transformer coupled to the main inductor, the secondary of the transformer being in series with the second capacitor; and a means for enabling the flow of a time varying voltage across the first and second capacitors that has a frequency much less than the ripple frequency of the current in the main inductor.

12 Claims, 4 Drawing Sheets

RIPPLE-CURRENT REDUCTION SCHEMES FOR AC CONVERTERS

BACKGROUND OF THE INVENTION

The present disclosure is in the field of ripple-current reduction techniques and, more particularly, relates to the application of such techniques to power electronic circuits, particularly those of AC converters that include inductors.

Inductors are used in many ways in power electronic converters including operation as filters, energy storage and high frequency decoupling. In most cases a low frequency current and a high frequency ripple current will flow in the main inductor. This current is present due to the switching involved in the operation of power electronic circuits. An inductor may also be connected to a capacitor to create a low-pass filter to allow the flow of low frequency current and to reduce AC ripple of the desired voltage. A critical problem that arises in such circuitry is that ripple currents in a capacitor induce heating by reason of conductor losses and dielectric losses. The heating of the capacitor in turn reduces its life expectancy. Accordingly, any means that will reduce the ripple current into the capacitor has the potential to increase the life expectancy of a system that uses the capacitor. In addition, the reduction in the ripple current can reduce the required total capacitance which in turn can lead to a reduction in the size of the capacitor and, hence, of the system. This is conventionally achieved by the mechanism of defining a fixed allowable ripple voltage across the terminals of the main capacitor before and after the ripple current reduction. An alternative embodiment can be achieved by reducing the inductance value of the inductor and maintaining the capacitance as per the original design.

The existence of old techniques, or techniques that have become available recently, can reduce the ripple voltage on a capacitor and may include an increase in the frequency of the ripple current. Unfortunately, this can also increase the stress on the capacitor more than the benefits provided by a reduction in the ripple current amplitude. This consequence follows because the losses in the capacitor are frequency dependent. Also, the problem is exacerbated when the power level of the converters is high. Another method has been used is to reduce the ripple voltage across the capacitor terminals by the addition of more filter components. However, since classic filter design requires that these filters carry the full power of the converter system, the cost of such additional filters outweighs the benefits. There is also difficulty in damping these complex filter arrangements. In addition, the total ripple can only be spread out between all the components.

SUMMARY OF THE INVENTION

The above noted problem in connection with AC converters has been overcome by the present disclosure wherein an AC ripple current reduction circuit is provided comprising an arrangement of a low frequency modulated high frequency AC voltage source at the input, and wherein a first capacitor is provided across which the circuit output voltage is obtained, a main inductor being connected in series with that first capacitor and the input and including an auxiliary circuit having a second capacitor whereby the flow of a time varying low frequency (AC) voltage across both of the capacitors is achieved, such voltage having a frequency much less than the ripple frequency of the current in the main inductor. There is a second inductor connected in series with the second capacitor and the transformer.

The benefits of the AC ripple reduction circuit of the present disclosure can be achieved by means of several embodiments. It can be realized in a single-phase form or expanded to include 3-phase AC circuits that can be configured to operate in Y or Δ-based configurations. Additionally, a zero sequence current version is provided for the AC ripple reduction circuit, wherein with this configuration the main inductor is placed between the neutral and the ground of a 3-phase Y-connected circuit. Accordingly, it will be appreciated that any current flowing in the ground path will also have its ripple component reduced in much the same manner as for a single-phase ripple current reduction circuit.

The foregoing and still further objects and advantages of the present disclosure will be more apparent from the following detailed explanation of the preferred embodiments of the disclosure in connection with the accompanying drawings.

DETAILED DESCRIPTION

Figure 1:
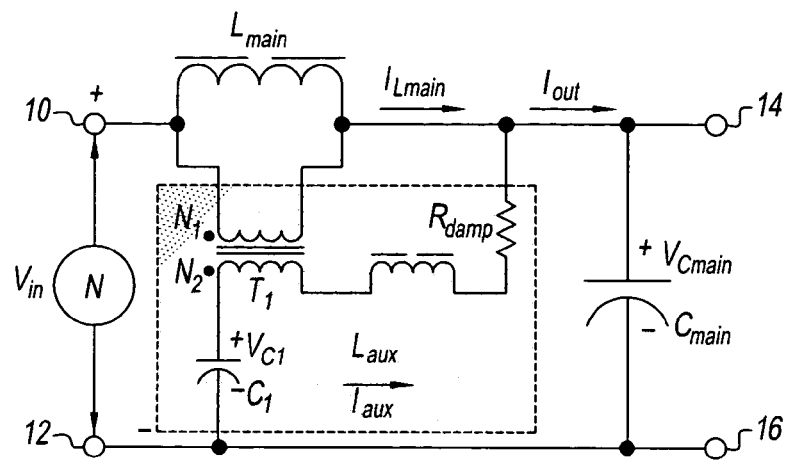
FIG. 1 Depicts a first embodiment of the AC converter ripple reduction circuit.

Referring now to FIG. 1 of the drawings, the AC ripple current reduction circuit of one embodiment in accordance with the present disclosure is depicted. The AC ripple reduction circuit of FIG. 1 includes an output capacitor designated $C_{main}$ and an auxiliary circuit capacitor designated C1, which have a time varying voltage across it with a frequency much less than the ripple frequency of the current in the inductor $L_{main}$ seen in FIG. 1.

It will be noted that in FIG. 1 other elements are provided; that is, other than the main capacitor $C_{main}$ and the auxiliary circuit capacitor $C_1$. The circuit also includes a low frequency modulated high frequency source of AC voltage $V_{in}$ across the terminals 10 and 12; main inductor $L_{main}$ is connected to the upper terminal 10, such that a series circuit is constituted by the connection of $L_{main}$ to the output or main capacitor $C_{main}$ across which an output voltage $V_{Cmain}$ appears. An auxiliary circuit is connected from the output of $L_{main}$ and includes, connected to terminal 12, the auxiliary capacitor $C_1$ which is connected in series with the secondary of transformer $T_1$ and an auxiliary inductor $L_{aux}$, as well as resistor $R_{damp}$, which is connected to the upper output terminal 14. The transformer $T_1$, whose secondary is connected as just noted, has its primary side connected across the main inducter $L_{main}$.

It will thus be understood from the description of FIG. 1 that in the operation of the AC ripple current reduction circuit there is injected an opposing current $I_{aux}$ of the ripple current into one end of the main inductor on the side connected to the main capacitor $C_{main}$. The return path of the injected current in the common of the main ripple voltage source and the main capacitor $C_{main}$. The main current is not present in the inverse ripple current and is derived from the main inductor current. As a result, the ripple current in the AC filter capacitor $C_{main}$ is greatly reduced, thereby relieving the already noted stresses and losses in this capacitor, as well as increasing its filtering effectiveness.

It will now be apparent that there are several advantages provided by the present disclosure. The AC ripple current reduction circuit reduces the ripple current of the inductor in the attached capacitor. Hence, this circuit can be used to reduce the capacitance of the output and to reduce the stresses on the capacitor $C_{main}$ connected to the inductor and carrying the ripple current. In addition, the auxiliary circuit already described of the AC ripple current reduction circuit carries only the main ripple current amplitude; there is very little low frequency current component. This can be verified by reference to FIG. 2 in which voltage and current waveforms on the circuit of the present disclosure have been depicted.

Figure 2:
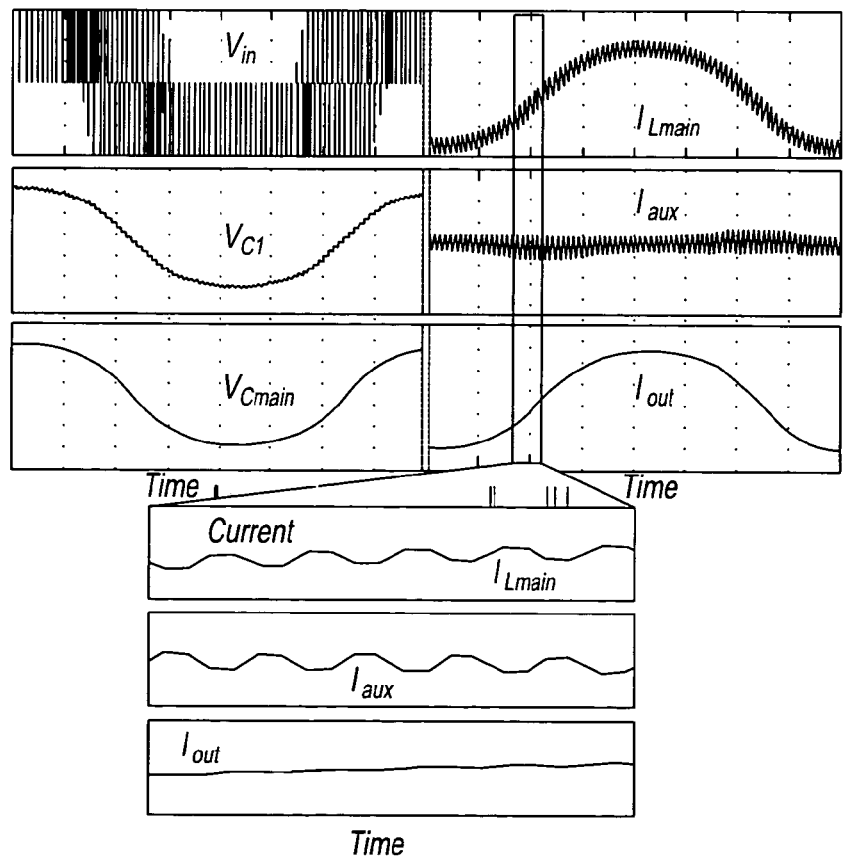
FIG. 2 Depicts typical voltage and current waveforms for the circuit of FIG. 1; the lower portion shows the "zoomed in" current waveforms.

FIG. 2 shows some typical voltage in current waveforms for the circuit of FIG. 1. It can clearly be seen that the auxiliary current ($I_{aux}$) ripple is the inverse of the ripple current in the main inductor $L_{main}$. Also clearly shown is the low frequency AC voltages $V_{C1}$ and $V_{Cmain}$ across capacitors $C_1$ and $C_{main}$. The waveforms depicted in FIG. 2 have been generated by means of a computer simulation.

The AC ripple current reduction circuit of the present disclosure has been shown in the one version or embodiment involving a single-phase circuit. However, the same circuit reduction principle is suitable for application to three phase circuits and can be used for either Y or Δ-base circuits, as well as zero sequence circuits, as will now be described.

Figure 3:
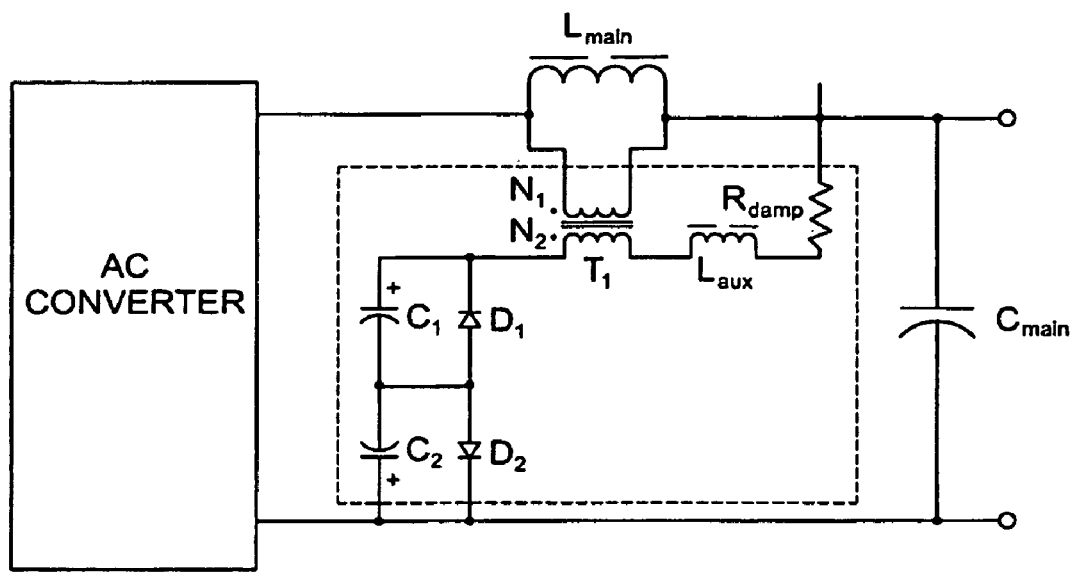
FIG. 3 Shows an alternative embodiment for the single-phase AC ripple reduction circuit using polarized capacitors in the auxiliary circuit.

Turning now to FIG. 3, a slightly modified version of the ripple reduction circuit of FIG. 1 is shown wherein polarized capacitors $C_1$ and $C_2$ are used in the auxiliary circuit. Hence, diodes $D_1$ and $D_2$ are shown in parallel, respectively, with $C_1$ and $C_2$. Polarized capacitors of this sort may be used for increased capacitance in the circuit. In some cases polarized capacitors exhibit higher losses, which translate to a higher equivalent series resistance (ESR) and can be used as all or part of the damping resistor ($R_{damp}$) of FIG. 1. The diodes $D_1$ and $D_2$ can be rated with the low frequency of the system as they only conduct every half-cycle of the low frequency.

Figure 4:
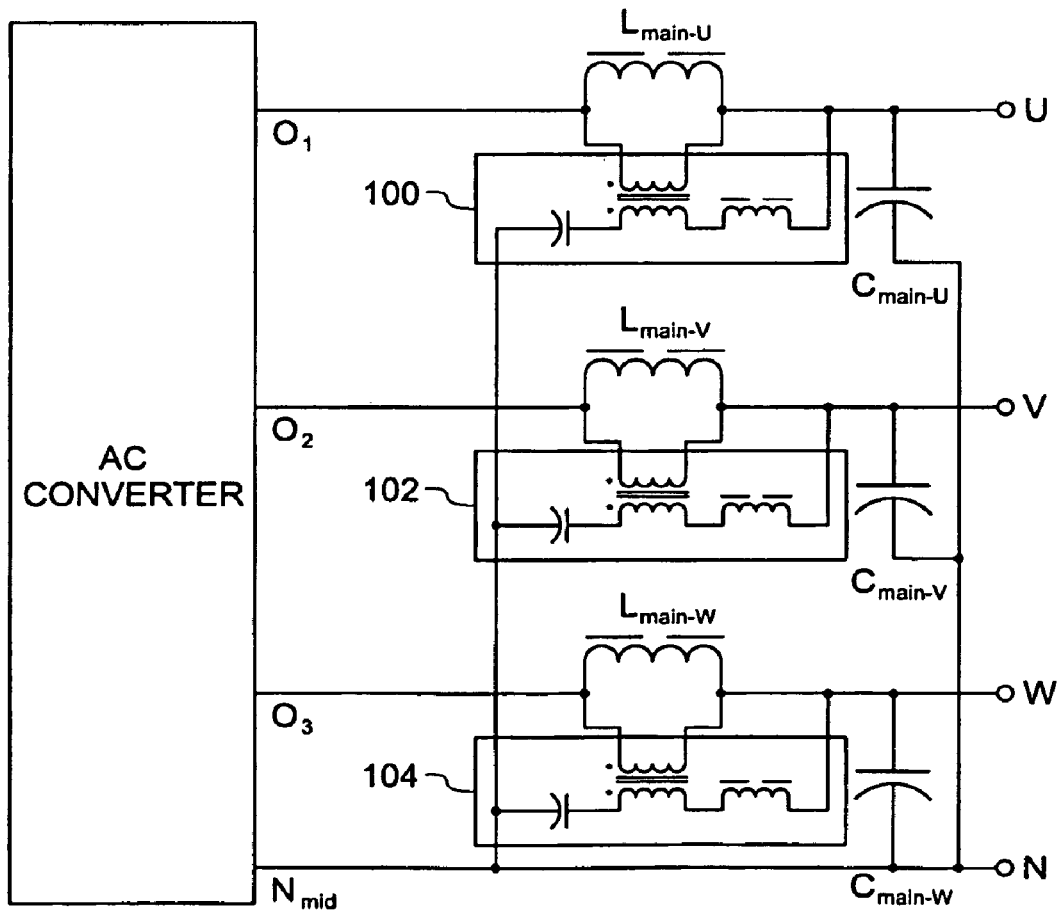
FIG. 4 Illustrates an implementation of AC ripple reduction circuit in a three-phase Y-connected system.

Referring now to FIG. 4, this shows how the AC ripple reduction circuit can be implemented in a 3-phase Y-connected system. In this figure, three separate, slightly modified auxiliary circuits 100, 102, 104 are respectively connected to the respective inputs O1, O2, O3, at the U, V and W outputs of the respective portions of the Y connection and the other side of the auxiliary circuits are all connected to neutral end. Thus, the neutral conductor serves as the common return for the ripple reduction circuits. Accordingly, it can clearly be understood that in this configuration the ripple reduction circuit is simply repeated for each phase.

Figure 5:
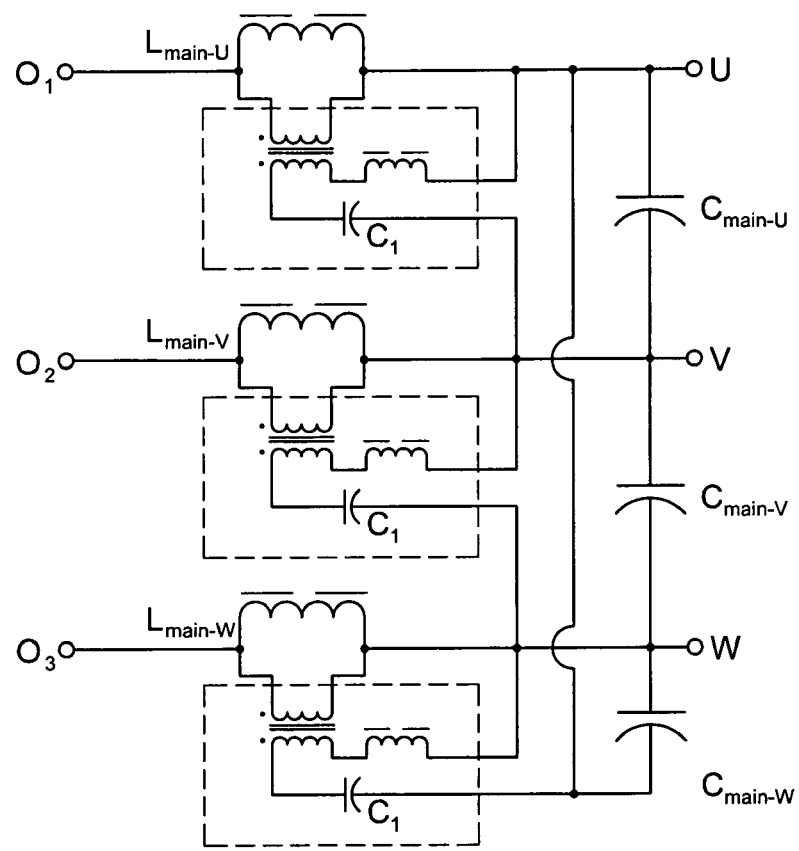
FIG. 5 Illustrates a three-phase delta connected circuit implementation of the ripple reduction circuit.

Referring to FIG. 5, depicted is a 3-phase Δ-connected implementation of the ripple reduction circuit. Unlike the 3-phase Y-connected circuit, no neutral is available for the return path of each of the ripple reduction circuits. In this case, the return path is provided by using the adjacent voltage node of another phase. This can be done as an effective high frequency return path has been created. There may be some phase shift in the voltage between the auxiliary circuit capacitor $C_1$ and the corresponding output voltage.

Figure 6:
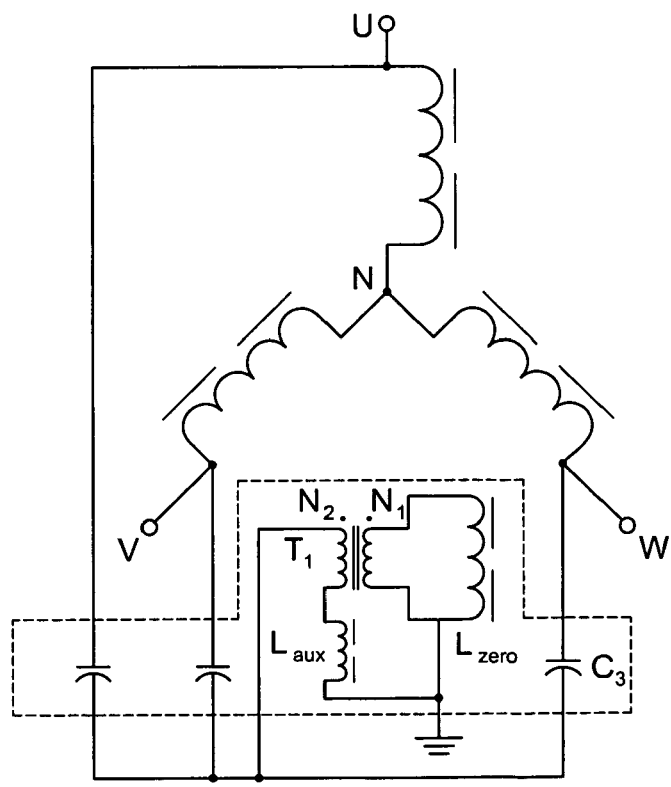
FIG. 6 Illustrates an implementation of AC ripple reduction circuit for zero sequence ripple current reduction.

FIG. 6 depicts the way the AC ripple reduction circuit for zero sequence operation is implemented. In this application the common return path is not available, and one has been created by splitting the auxiliary circuit capacitor into three capacitors $C_1$, $C_2$, and $C_3$, and connecting the capacitors to phase voltage nodes 150, 152, and 154, respectively, as seen.

Figure 7:
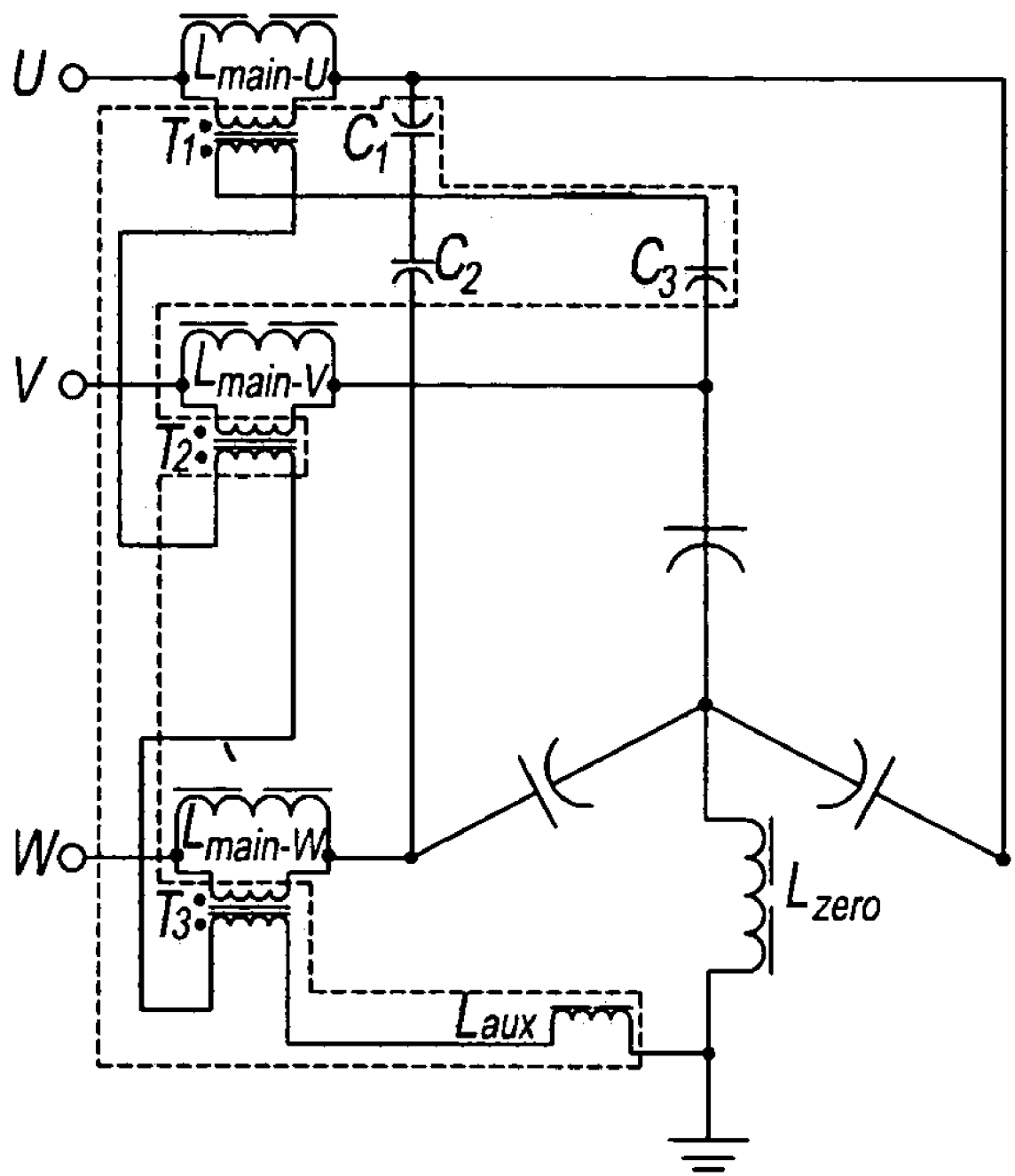
FIG. 7 Illustrates an alternative form of the zero sequence AC ripple current reduction circuit using inductors in the series path of the voltage nodes.

FIG. 7 shows an alternative form of the zero sequence AC ripple current reduction circuit that makes use of inductors in the series path of each of the voltage nodes. In this configuration the ripple current information of each phase is combined to derive the total ripple current that can be used for the reduction process. Once again, the common return path is not available and is artificially made in the same manner as described for the circuit of FIG. 6.

In order to provide to the men skilled in the art information with respect to a source for the ripple circuit of FIG. 1, an example for the source $V_{in}$ is a well-known Pulse Width Modulated (PWM) inverter. The purpose of such an inverter is to convert a DC voltage to an AC voltage. Such an inverter would be made up of a DC-bus capacitor across which two switching devices are connected. The switching devices can be MOSFET (Metal Oxide Silicon Field Effect Transistor), IGBT (Insulated Gate Bi-polar Transistor) or other well known semi-conductor switches. The two switching devices are connected in series. The two switches can never be turned on at the same time as this would constitute a short circuit across the capacitor. The switching devices are turned on and off in sequence such that the on-time of one will be the off time of the other and vice-versa. The switching devices are turned on and off at the rate of the switching frequency (or carrier) and is the high frequency component. The on-time (or off time for the other device) can then be modulated from a minimum to a maximum within the confines of the switching frequency time by a modulating frequency (low frequency). The center connection of the two switching devices form one connection of the source $V_{in}$ and a common point to the capacitor, such as the positive, or negative terminal the other connection of the source $v_{in}$. This high frequency modulated with a low frequency voltage is then be filtered to extract the low frequency component for the output. A filter is used for this purpose and an example is one made up using $L_{main}$ and $C_{main}$.

The inverter is similar to a DC to DC converter for example. The main difference between the DC ripple circuit and the AC ripple circuit of the present disclosure is the input voltage of the DC version only has one frequency (the carrier) and the AC version has two frequencies (the carrier and the modulator).

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated for carrying out this disclosure, but that the disclosure will include all embodiments falling within the scope of the appended claims.

What is claimed is:

1. An AC ripple current reduction circuit for an AC converter, comprising:

a low frequency modulated high frequency AC voltage source at the input;

a first capacitor across which the circuit output voltage is provided;

a first, main inductor in series with the first capacitor;

an auxiliary circuit including a second capacitor and a transformer coupled to the main inductor, the transformer secondary being in series with the second capacitor; and means for enabling the flow of a time varying voltage across the first and second capacitors that has a frequency much less than the ripple frequency of the current in the main inductor.

2. An AC ripple current reduction circuit as defined in claim 1, further comprising a secondary inductor and a damping resistor in series with the second inductor.

3. An AC ripple current reduction circuit for an AC converter, comprising:

a low frequency modulated high frequency AC voltage source at the input;

a first capacitor across which the circuit output voltage is provided;

a first, main inductor in series with the first capacitor;

a second capacitor in an auxiliary circuit; and means for enabling the flow of a time varying voltage across the first and second capacitors that has a frequency much less than the ripple frequency of the current in the main inductor.

4. An AC ripple current reduction circuit for an AC converter, comprising:

a three-phase low frequency modulated high frequency AC voltage source at the input;

the ripple current reduction circuit being Y-connected and having three sections, each section including:

a first capacitor across which the circuit output voltage is provided;

a first, main inductor in series with the first capacitor;

an auxiliary circuit including a second capacitor and a transformer coupled to the main inductor, the primary of the transformer being in series with the first capacitor; and second inductor connected in series with the secondary of the transformer.

5. An AC ripple current reduction circuit for an AC converter, comprising:

a three-phase low frequency modulated high frequency AC voltage source at the input;

the ripple current reduction circuit being D-connected and having three sections, each section including:

a first capacitor across which the circuit output voltage is provided;

a first, main inductor in series with the first capacitor;

an auxiliary circuit including a second capacitor and a transformer coupled to the main inductor, the primary of the transformer being in series with the first capacitor; and second inductor connected in series with the secondary of the transformer.

6. An AC ripple current reduction circuit, comprising:

an AC converter at the input;

a first capacitor across which the circuit output voltage is provided;

a first, main inductor in series with the first capacitor;

an auxiliary circuit including a second capacitor and a transformer coupled to the main inductor, the primary of the transformer being in series with the first capacitor; and a second inductor connected in series with the secondary of the transformer.

7. An AC ripple current reduction circuit as defined in claim 6, further comprising a damping resistor in series with the second inductor.

8. An AC ripple current reduction circuit, comprising:

an AC converter at the input;

first capacitor across which the circuit output voltage is provided;

a first, main inductor in series with the first capacitor;

a second capacitor in an auxiliary circuit; and means for enabling the flow of a time varying voltage across the first and second capacitors that has a frequency much less than the ripple frequency of the current in the main inductor.

9. An AC ripple current reduction circuit, comprising:

a three-phase AC converter at the input;

the ripple current reduction circuit being Y-connected and having three sections, each section having a first capacitor across which the circuit output voltage is provided;

a first, main inductor in series with the first capacitor;

an auxiliary circuit including a second capacitor and a transformer coupled to the main inductor, the primary of the transformer being in series with the first capacitor;

a second inductor connected in series with the secondary of the transformer; and a neutral to which each of the first capacitors in the three sections is connected.

10. An AC ripple reduction circuit as defined in claim 9, further comprising means for enabling zero sequence operation, including a connection of a third inductor from a neutral point to ground.

11. An AC ripple current reduction circuit as defined in claim 9 further comprising means for enabling zero sequence operation, including a connection from a neutral point and ground.

12. An AC ripple current reduction circuit, comprising:

a three-phase AC converter at the input;

the ripple current reduction circuit being D-connected and having three sections, each section including:

a first capacitor across which the circuit output voltage is provided;

a first, main inductor in series with the first capacitor;

an auxiliary circuit including a second capacitor and a transformer coupled to the main inductor, the primary of the transformer being in series with the first capacitor; and a second inductor connected in series with the secondary of the transformer.

* * * * *